(12) United States Patent
Dubey

(10) Patent No.: US 8,298,332 B2
(45) Date of Patent: Oct. 30, 2012

(54) LIGHTWEIGHT CEMENTITIOUS COMPOSITIONS AND BUILDING PRODUCTS AND METHODS FOR MAKING SAME

(75) Inventor: Ashish Dubey, Grayslake, IL (US)

(73) Assignee: United States Gypsum Company, Chicago, IL (US)

( * ) Notice: Subject to any disclaimer, the term of this patent is extended or adjusted under 35 U.S.C. 154(b) by 0 days.

(21) Appl. No.: 13/282,689

(22) Filed: Oct. 27, 2011

(65) Prior Publication Data

US 2012/0040165 A1 Feb. 16, 2012

Related U.S. Application Data

(62) Division of application No. 11/773,865, filed on Jul. 5, 2007, now Pat. No. 8,070,878.

(51) Int. Cl.
*C04B 14/18* (2006.01)

(52) U.S. Cl. .................. 106/713; 264/333; 156/39

(58) Field of Classification Search .................. 106/713; 264/333; 156/39
See application file for complete search history.

(56) References Cited

U.S. PATENT DOCUMENTS

| | | | |
|---|---|---|---|
| 3,010,840 A | 11/1961 | Goff et al. | |
| 3,841,885 A | 10/1974 | Jakel | |
| 3,847,633 A | 11/1974 | Race | |
| 3,989,534 A | 11/1976 | Plunguian et al. | |
| 4,057,608 A | 11/1977 | Hashimoto et al. | |
| 4,100,115 A | 7/1978 | Baer | |
| 4,203,456 A | 5/1980 | Miller | |
| 4,293,341 A | 10/1981 | Dudley et al. | |
| 4,303,450 A | 12/1981 | Hacker | |
| 4,488,909 A | 12/1984 | Galer et al. | |
| 4,518,431 A | 5/1985 | Duvier, Jr. | |
| 4,659,385 A | 4/1987 | Costopoulos et al. | |
| 4,686,253 A | 8/1987 | Struss et al. | |
| 5,114,617 A | 5/1992 | Smetana et al. | |
| 5,174,819 A | 12/1992 | Carlson | |
| 5,221,386 A | 6/1993 | Ensminger et al. | |
| 5,250,578 A | 10/1993 | Cornwell | |
| 5,256,222 A | 10/1993 | Shepherd et al. | |
| 5,294,255 A | 3/1994 | Smetana et al. | |
| 5,356,446 A | 10/1994 | Smetana et al. | |

(Continued)

FOREIGN PATENT DOCUMENTS

JP S58-36963 A 4/1983

(Continued)

OTHER PUBLICATIONS

Office Action dated May 24, 2012 from corresponding Japanese Patent Appl No. 2010-515228.

*Primary Examiner* — Paul Marcantoni

(74) *Attorney, Agent, or Firm* — Novak Druce + Quigg, LLP; David F. Janci; Philip T. Petti

(57) ABSTRACT

Cementitious compositions and methods for making same, in which the cementitious compositions include 35-60 wt. % cementitious reactive powder (also termed Portland cement-based binder), 2-10 wt. % expanded and chemically coated perlite filler, 20-40 wt. % water, entrained air, and optional additives such as water reducing agents, chemical set-accelerators, and chemical set-retarders. In addition, the lightweight cementitious compositions may contain 0-25 wt. % on a wet basis secondary fillers such as expanded clay, shale aggregate, and pumice.

18 Claims, 1 Drawing Sheet

U.S. PATENT DOCUMENTS

| | | |
|---|---|---|
| 5,482,550 A | 1/1996 | Strait |
| 5,542,358 A | 8/1996 | Breslauer |
| 5,718,758 A | 2/1998 | Breslauer |
| 5,759,260 A | 6/1998 | Groh |
| 6,187,409 B1 | 2/2001 | Mathieu |
| 6,290,769 B1 | 9/2001 | Carkner |
| 6,358,575 B1 | 3/2002 | Spragg |
| 6,391,958 B1 | 5/2002 | Luongo |
| 6,488,792 B2 | 12/2002 | Mathieu |
| 6,641,658 B1 | 11/2003 | Dubey |
| 6,869,474 B2 | 3/2005 | Perez-Pena et al. |
| 6,875,266 B1 | 4/2005 | Naji et al. |
| 6,881,257 B2 | 4/2005 | Beauboeuf |
| 6,907,708 B2 | 6/2005 | Naji et al. |
| 7,056,964 B2 | 6/2006 | Lettkeman et al. |
| 7,736,431 B2 | 6/2010 | Bui |
| 8,070,878 B2 * | 12/2011 | Dubey .................. 106/713 |
| 2002/0090871 A1 | 7/2002 | Ritchie et al. |
| 2003/0159391 A1 | 8/2003 | Naji et al. |
| 2006/0217464 A1 | 9/2006 | Guevara et al. |
| 2006/0292358 A1 | 12/2006 | Robertson et al. |
| 2007/0062415 A1 | 3/2007 | Guevara et al. |
| 2008/0058446 A1 | 3/2008 | Guevara et al. |
| 2009/0038248 A1 | 2/2009 | Koslowski |

FOREIGN PATENT DOCUMENTS

| | | |
|---|---|---|
| JP | S63-502425 A | 9/1988 |
| JP | S64-9880 A | 1/1989 |
| JP | H7-233587 A | 9/1995 |
| JP | 2003-516302 A | 5/2003 |
| JP | H04-500065 A | 7/2010 |
| KR | 10-1996-0011321 B1 | 8/1996 |
| WO | 87/05008 A1 | 8/1987 |
| WO | 90/14319 A1 | 11/1990 |

* cited by examiner

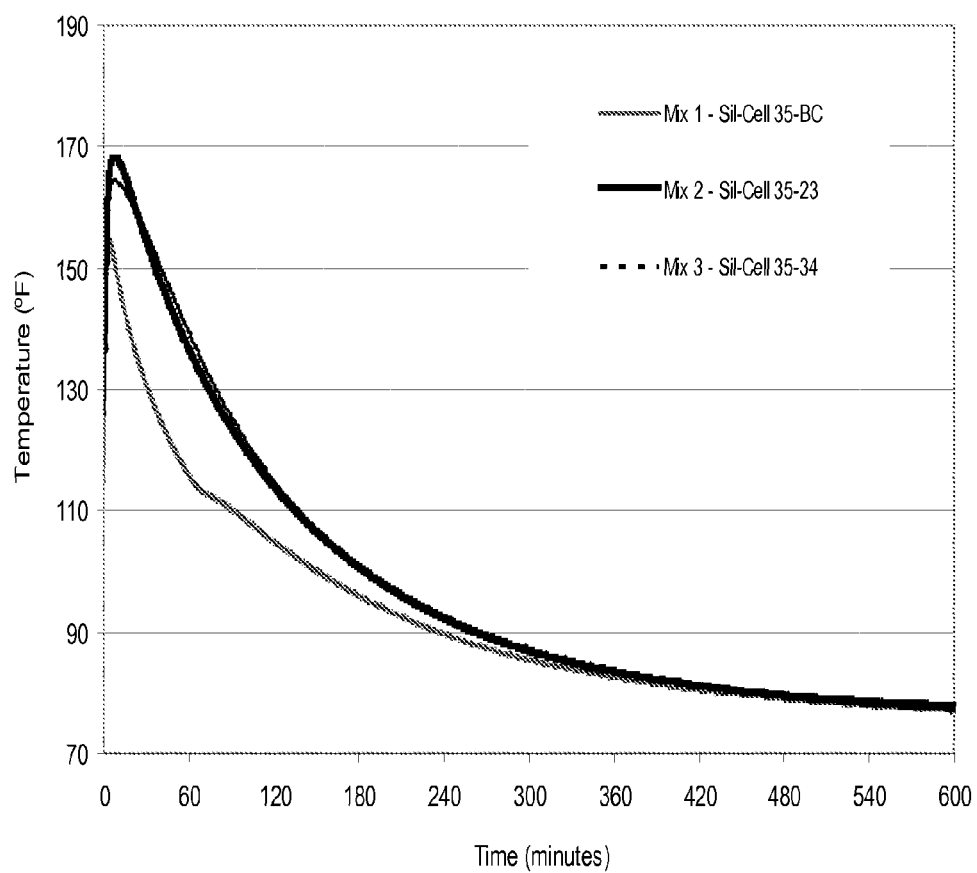

LIGHTWEIGHT CEMENTITIOUS COMPOSITIONS AND BUILDING PRODUCTS AND METHODS FOR MAKING SAME

CROSS-REFERENCE TO RELATED APPLICATIONS

This application is a divisional application of U.S. application Ser. No. 11/773,865, filed Jul. 5, 2007, incorporated herein by reference.

FIELD OF THE INVENTION

This invention relates to lightweight cementitious compositions for manufacturing cement-based panels and building products. In particular, the cementitious compositions and products have a density in the range of about 40 to 80 pounds per cubic foot (0.64 to 1.28 g/cc), preferably about 45 to 65 pounds per cubic foot (0.72 to 1.04 g/cc).

BACKGROUND OF THE INVENTION

U.S. Pat. No. 6,869,474 to Perez-Pena et al., incorporated herein by reference, discusses fast setting of cementitious compositions for producing cement-based products such as cement boards is achieved by adding an alkanolamine to a hydraulic cement such as Portland cement, and forming a slurry with water under conditions that provide an initial slurry temperature of at least 90° F. (36° C.). Additional reactive materials may be included such as high alumina cement, calcium sulfate and a pozzolanic material such as fly ash. The extremely rapid set permits rapid production of cementitious products. Triethanolamine additions have been found to be a very powerful accelerator capable of producing formulations with relatively short final setting times with increased levels of fly ash and gypsum and without the need of calcium aluminate cements. However, formulations with triethanolamine also had relatively lower early-age compressive strength compared to previous cement board formulations containing the calcium aluminate cements.

U.S. Pat. No. 6,641,658 to Dubey, incorporated herein by reference, discusses rapid setting cementitious composition useful for making cement boards containing as reactive powders portland cement, pozzolan, high alumina cement, and insoluble calcium sulfate anhydrite, which provide reduced setting times compared to the prior-art cementitious compositions. The composition preferably comprises as a reactive powder blend 35 to 90 wt. % Portland cement, 0 to 55 wt. % pozzolan, 5 to 15 wt. % high alumina cement, and 1 to 8 wt. % insoluble calcium sulfate anhydrite. Substitution of insoluble calcium sulfate anhydrite for conventional soluble gypsum (a dihydrate) increases the release of heat and decreases setting times, despite the use of very high amounts of pozzolanic materials, preferably fly ash. The cementitious composition may also include lightweight aggregates and fillers, plus additives to impart other useful properties as desired, such as superplasticizers, set retarders, and set accelerators.

U.S. Pat. No. 4,488,909 to Galer et al., incorporated herein by reference, discusses cementitious compositions capable of rapid setting. The compositions permit high speed production of carbon dioxide resistant cement boards by forming essentially all of the potential ettringite within about 20 minutes after the composition is mixed with water. The essential components of the cementitious composition are Portland cement, high alumina cement, calcium sulfate and lime. Pozzolans such as fly ash, montmorillonite clay, diatomaceous earth and pumicite may be added up to about 25%. The cement composition includes about 14 to 21 wt. % high alumina cement, which in combination with the other components makes possible the early formation of ettringite and other calcium aluminate hydrates responsible for early setting of the cementitious mixture. In their invention, Galer et al. provided aluminates using high alumina cement (HAC) and sulfate ions using gypsum to form ettringite and achieve rapid setting of their cementitious mixture.

Ettringite is a compound of calcium aluminum sulfate compound having the formula $Ca_6Al_2(SO_4)_3 \cdot 32H_2O$ or alternatively $3\ CaO \cdot Al_2O_3 \cdot 3CaSO_4 \cdot 32H_2O$. Ettringite forms as long needle-like crystals and provides rapid early strength to cement boards, so they can be handled soon after being poured into a mold or over a continuous casting and forming belt.

SUMMARY OF THE INVENTION

It is an object of the invention to provide lightweight cementitious compositions for manufacturing cement-based panels and building products.

It is another object of the invention to provide cementitious compositions and products have a density in the range of about 40 to 80 pounds per cubic foot (0.64 to 1.28 g/cc), preferably about 45 to 65 pounds per cubic foot (0.72 to 1.04 g/cc). The preferred flexural strength of boards made from this composition ranges between 400 to 2000 psi (2.76 to 13.8 MPa). The most preferred flexural strength ranges between 750 to 1750 psi (5.17 to 12.1 MPa). The preferred maximum deflection of boards, measured in a flexural test conducted per ASTM C 947 for specimen tested over 10 inch span, made from this composition ranges between 0.25 to 1.75 inches (0.64 to 4.5 cm). The most preferred maximum deflection ranges between 0.50 to 1.25 inches (1.3 to 3.18 cm).

It is another object of the present invention to provide lightweight cementitious panels that on a ½ inch (1.27 cm) thickness basis weigh preferably less than 3.3 pounds per sq.ft. (16.1 kg per sq. m), more preferably less than 2.5 pounds per sq.ft. (12.2 kg per sq. m), and most preferably less than 2.1 pounds per sq.ft. (10.25 kg per sq. m).

It is another object of the present invention to provide cementitious panels that are used as durable and bondable substrate for installation of ceramic tiles, dimensional stones, and plaster finishes.

It is another object of the present invention to provide cementitious panels that have good water repellency and resistance to water penetration.

It is another object of the present invention to provide cementitious products that have good moisture durability and dimensional stability to allow them to be used in wet areas in buildings.

It is another object of the present invention to provide lightweight cementitious products that are resistant to bacteria, mold, and fungal growth.

It is another object of the present invention to provide lightweight cementitious products that have good freeze-thaw durability.

It is another object of the present invention to provide lightweight cementitious products that are non-combustible.

It is another object of the present invention to provide lightweight cementitious products that have significantly improved handling, installation, and fastening characteristics.

It is another object of the present invention to provide lightweight cementitious panel products that have significantly improved score and snap performance and cutting characteristics.

It is another object of the present invention to provide cementitious compositions that in wet state have flowable consistency, are stable, and not prone to material segregation.

It is another object of the present invention to provide cementitious compositions that are responsible for development of good bond between the cementitious core and surface reinforcing meshes in thin cementitious panel products during and after manufacturing.

It is another object of the present invention to provide cementitious compositions that lead to efficient processing of lightweight cementitious products in commercial manufacturing environments.

It is another object of the present invention to provide methods for preparing lightweight cementitious compositions for manufacturing cement-based panels and building products.

Thus, this invention relates generally to fast setting lightweight cementitious composition for construction of panels or boards.

The cementitious composition includes 35-60 wt. % cementitious reactive powder (also termed Portland cement-based binder), 2-10 wt. % expanded and chemically coated perlite filler, 20-40 wt. % water, entrained air, for example 10-50 vol. %, on a wet basis, entrained air, and optional additives such as water reducing agents, chemical set-accelerators, and chemical set-retarders. The lightweight cementitious compositions may also optionally contain 0-25 wt. % secondary fillers, for example 10-25 wt. % secondary fillers. Typical filler include one or more of expanded clay, shale aggregate, and pumice.

The cementitious reactive powder used in the present invention is typically composed of either pure Portland cement or a mixture of Portland cement and a suitable pozzolanic material such as fly ash or blast furnace slag. The cementitious reactive powder may also optionally contain one or more of gypsum (land plaster) and high alumina cement (HAC) added in small dosages to influence setting and hydration characteristics of the binder.

Obtaining the lightweight density is assisted by employing (i) expanded perlite employing special attributes and (ii) air entrainment.

The expanded perlite filler occupies 7.5-40% of the composite volume, is preferably composed of particles having a median particle size of 20-60 microns in diameter, preferably has a particle density of less than 0.30 g/cc, and is coated with silane, siloxane, silicone or a mixture thereof. This expanded perlite filler is unique in that it is chemically coated for water-tightness and water repellency. Furthermore, the coated expanded perlite filler has a particle size in a range that allows formation of an effective-water-tight closed cell particle structure with the applying of the chemical coating. The use of the selected coated expanded perlite filler is important to allowing preparation of workable and processable cementitious slurries at low water usage rates. Lower amounts of water in the composition result in a product having superior mechanical properties and physical characteristics.

The entrained air represents 10-50% of composite volume on a wet basis. Air-entrainment in the compositions of the invention is provided by means of suitable surfactants that form a stable and uniform structure of air voids in the finished product.

The cementitious compositions of the present invention can be used to make precast concrete products such as cement boards with excellent moisture durability for use in wet and dry locations in buildings. The precast concrete products such as cement boards are made under conditions which provide a rapid setting of the cementitious mixture so that the boards can be handled soon after the cementitious mixture is poured into a stationary or moving form or over a continuously moving belt.

The lightweight cementitious compositions and products typically have one or more of the following advantages:

low water demand flowable and workable slurries obtained at low water dosages lightweight density high compressive strength excellent water durability excellent dimensional stability under changing environmental conditions excellent water penetration resistance through the product thickness excellent bonding strength to finish surfaces such as ceramic tiles and cement mortars rapid setting behavior superior aesthetics and appearance.

Typically a cement board made by curing the above-described composition has a thickness of about ¼ to 1 inches (6.3 to 25.4 mm).

All percentages, ratios and proportions herein are by weight, unless otherwise specified. Also, any average molecular weights are weight average molecular weight unless specified otherwise.

BRIEF DESCRIPTION OF THE DRAWING

FIG. 1 shows slurry temperature rise response for the mixes investigated in Example 11.

DETAILED DESCRIPTION OF THE INVENTION

Cementitious Composition

TABLE 1 describes mixtures used to form the lightweight cementitious compositions of the present invention. The volume occupied by the chemically coated perlite is in the range of 7.5 to 40% and the volume occupied by the entrained air is in the range of 10 to 50% of the overall volume of the composition. This significantly assists in producing cement products having the desired low density of about 40 to 80 pcf (0.64 to 1.28 g/cc), preferably about 45 to 65 pounds per cubic foot (0.72 to 1.04 g/cc).

TABLE 1

Lightweight Cementitious Compositions

| Ingredient | Weight % | Volume % |
| --- | --- | --- |
| Portland cement-based binder (cementitious reactive powder) | 35-60 | 10-25 |
| Chemically coated perlite | 2-10 | 7.5-40 |
| Expanded clay and shale aggregate | 0-25 | 0-15 |
| Water | 20-40 | 20-40 |
| Entrained Air | — | 10-50 |

The cementitious composition preferably includes:

cementitious reactive powder comprising Portland cement and optionally a pozzolanic material (35-60% wt) (a typical mix included 100 parts Portland cement; 30 parts fly ash; 3 parts land plaster; expanded and chemically coated perlite filler (2-10% wt), entrained air (10-50% of the composite volume, the % of composite volume being the volume % of the slurry on a wet basis), water (20-40% wt), optional additives such as water reducing agents, accelerators, retarders, and optional secondary fillers (10-25% wt), for example expanded clay, shale aggregate and pumice;

wherein the total of expanded and chemically coated perlite filler and secondary fillers, for example expanded clay, shale aggregate and/or pumice, is at least 20% wt.

Chemically Coated Expanded Perlite Filler

The expanded perlite filler is 2-10 weight %, 7.5-40 volume % of the cementitious composition slurry. The expanded perlite filler is composed of particles having a mean particle diameter typically between 20-500 microns or 20 to 250 microns, preferably between 20-150 microns, more preferably between 20-90 microns, and most preferably between 20-60 microns, an effective particle density preferably less than 0.50 g/cc, more preferably less than 0.40 g/cc and most preferably less than 0.30 g/cc, and chemically treated with silane, siloxane, silicone coatings or a mixture thereof. This expanded perlite filler is unique in that it is chemically coated for water-tightness and water repellency.

Furthermore, the coated expanded perlite filler particle size allows formation of an effective-water-tight closed cell particle structure with the applying of the chemical coating. The use of the selected coated expanded perlite filler is important to allowing preparation of workable and processable cementitious slurries at low water usage rates. Lower amounts of water in the composition results in a product having superior mechanical properties and physical characteristics. The most preferred chemical coating compounds for making perlite particles water-tight and water repellant are alkyl alkoxy silanes. Octyltriethoxy silane represents the most preferred alkyl alkoxy silane to coat perlite for using with the cementitious compositions of this invention.

One of the most preferred commercially available chemically coated perlite fillers is SIL-CELL 35-23 available from Silbrico Corporation. SIL-CELL 35-23 perlite particles are chemically coated with alky alkoxy silane compound. Another preferred chemically coated perlite filler is SIL-CELL 35-34 available from Silibrico Corporation. SIL-CELL 35-34 perlite particles are also useful in cementitious compositions of the invention and are coated with silicone compound. DICAPERL 210 and DICAPERL 220 are yet another two commercial coated perlite filler products produced by Grefco Minerals Inc. that are preferred in this invention. DICAPERL 210 perlite, with alkyl alkoxy silane compound is particularly preferred in the cementitious compositions of the invention. DICAPERL 220 perlite, coated with silicone compound is also useful in the compositions of this invention.

Another very useful property of the perlite fillers of the invention is that they display pozzolanic properties because of their small particle size and silica-based chemical nature. Owing to their pozzolanic behavior, the selected perlite fillers of the invention improve chemical durability of the cementitious composites while developing improved interfaces and enhanced bonding with the cementitious binders and other ingredients present in the mixture.

Yet another extremely important benefit results from the small size of the perlite filler particles of this invention. This improvement pertains to the manufacturability and performance characteristics of mesh reinforced cement board products produced using the perlite compositions of the invention. Selected perlite fillers of the invention enhance the overall amount of very fine particles (less than 75 microns) present in the composition. Presence of high content of fine particles in the composition is extremely useful in rapid processing of mesh reinforced cement board as it helps to improve the bond between the cementitious slurry and reinforcing mesh. Improved bond between cementitious slurry and reinforcing mesh leads to reduced occurrences of mesh delamination, faster cement board processing speeds, and improved production recoveries.

Cementitious Reactive Powder (Portland Cement-Based Binder)

The cementitious reactive powder (also termed Portland cement-based binder) used in the present invention is typically composed of either pure Portland cement or a mixture of Portland cement and a suitable pozzolanic material such as fly ash or blast furnace slag.

The cementitious reactive powder includes Portland cement, and also may include high alumina cement, calcium sulfate, and a mineral additive, preferably fly ash, to form a slurry with water. Cementitious reactive powder does not include inerts such as aggregate.

When the cementitious reactive powder of the invention includes only Portland cement and fly ash, the cementitious reactive powder preferably contains 40-90 wt. % Portland cement and 10-60 wt. % fly ash, or 40-80 wt. % Portland cement and 20-60 wt. % fly ash, wherein wt. % is based on the sum of the Portland cement and fly ash.

The cementitious reactive powder may also optionally contain one or other ingredients such as gypsum (land plaster) or high alumina cement added in small dosages to influence the setting and hydration characteristics of the binder. When such other ingredients are present, the cementitious reactive powder may contain 40-80 wt. % Portland cement, 0 to 20 wt. % high alumina cement, 0 to 7 wt. % calcium sulfate, and 0 to 55 wt. % fly ash based on the sum of these components.

Thus, the cementitious reactive powder blend of the cementitious composition may contain very high concentrations of mineral additives, such as pozzolanic materials, up to 55 wt % of the reactive powder blend. Increasing the content of mineral additives, e.g. fly ash, would help to substantially lower the cost of the product. Moreover, use of pozzolanic materials in the composition helps enhance the long-term durability of the product as a consequence of the pozzolanic reactions.

The reactive powder blend of the cementitious composition may be free of externally added lime. Reduced lime content helps lower the alkalinity of the cementitious matrix and thereby increase the long-term durability of the product.

Hydraulic Cement

Hydraulic cements, in particular Portland cement, make up a substantial amount of the compositions of the invention. It is to be understood that, as used here, "hydraulic cement" does not include gypsum, which does not gain strength under water, although typically some gypsum is included in Portland cement.

ASTM C 150 standard specification for Portland cement defines Portland cement as a hydraulic cement produced by pulverizing clinker consisting essentially of hydraulic calcium silicates, usually containing one or more of the forms of calcium sulfate as an inter-ground addition. More generally, other hydraulic cements may be substituted for Portland cement, for example calcium sulfo-aluminate based cements. To manufacture Portland cement, an intimate mixture of limestone and clay is ignited in a kiln to form Portland cement clinker. The following four main phases of Portland cement are present in the clinker—tricalcium silicate ($3CaO.SiO_2$, also referred to as $C_3S$), dicalcium silicate ($2CaO.SiO_2$, called $C_2S$), tricalcium aluminate ($3CaO.Al_2O_3$ or $C_3A$), and tetracalcium aluminoferrite ($4CaO.Al_2O_3.Fe_2O_3$ or $C_4AF$). The resulting clinker containing the above compounds is inter-ground with calcium sulfates to desired fineness to produce the Portland cement.

The other compounds present in minor amounts in Portland cement include double salts of alkaline sulfates, calcium oxide, and magnesium oxide. When cement boards are to be made, the Portland cement will typically be in the form of very fine particles such that the particle surface area is greater than 4,000 $cm^2$/gram and typically between 5,000 to 6,000 $cm^2$/gram as measured by the Blaine surface area method (ASTM C 204). Of the various recognized classes of Portland cement, ASTM Type III Portland cement is most preferred in the cementitious reactive powder of the cementitious compositions of the invention. This is due to its relatively faster reactivity and high early strength development.

In the present invention, the need for the use of Type III Portland cement is minimized and relatively fast early age strength development can be obtained using other cements instead of Type III Portland cement. The other recognized types of cements which may be used to replace or supplement Type III Portland cement in the composition of the invention include Type I Portland cement or other hydraulic cements including white cement, slag cements such as blast-furnace slag cement, pozzolan blended cements, expansive cements, sulfo-aluminate cements, and oil-well cements.

Mineral Additives

The cementitious reactive powder blend of the cementitious composition may contain high concentrations of mineral additives, such as pozzolanic materials and/or non-pozzolanic aggregates, for example, calcium carbonate, mica, talc, etc.

ASTM C618-97 defines pozzolanic materials as "siliceous or siliceous and aluminous materials which in themselves possess little or no cementitious value, but will, in finely divided form and in the presence of moisture, chemically react with calcium hydroxide at ordinary temperatures to form compounds possessing cementitious properties." Various natural and man-made materials have been referred to as pozzolanic materials possessing pozzolanic properties. Some examples of pozzolanic materials include pumice, diatomaceous earth, silica fume, tuff, trass, rice husk, metakaolin, ground granulated blast furnace slag, and fly ash. All of these pozzolanic materials can be used either singly or in combined form as part of the cementitious reactive powder of the invention.

Fly ash is the preferred pozzolan in the cementitious reactive powder blend of the invention. Fly ashes containing high calcium oxide and calcium aluminate content (such as Class C fly ashes of ASTM C618 standard) are preferred as explained below. Other mineral additives such as calcium carbonate, clays, and crushed mica may also be included.

Fly ash is a fine powder byproduct formed from the combustion of coal. Electric power plant utility boilers burning pulverized coal produce most commercially available fly ashes. These fly ashes consist mainly of glassy spherical particles as well as residues of hematite and magnetite, char, and some crystalline phases formed during cooling. The structure, composition and properties of fly ash particles depend upon the structure and composition of the coal and the combustion processes by which fly ash is formed. ASTM C618 standard recognizes two major classes of fly ashes for use in concrete—Class C and Class F. These two classes of fly ashes are derived from different kinds of coals that are a result of differences in the coal formation processes occurring over geological time periods. Class F fly ash is normally produced from burning anthracite or bituminous coal, whereas Class C fly ash is normally produced from lignite or sub-bituminous coal.

The ASTM C618 standard differentiates Class F and Class C fly ashes primarily according to their pozzolanic properties. Accordingly, in the ASTM C618 standard, the major specification difference between the Class F fly ash and Class C fly ash is the minimum limit of $SiO_2+Al_2O_3+Fe_2O_3$ in the composition. The minimum limit of $SiO_2+Al_2O_3+Fe_2O_3$ for Class F fly ash is 70% and for Class C fly ash is 50%. Thus, Class F fly ashes are more pozzolanic than the Class C fly ashes. Although not explicitly recognized in the ASTM C618 standard, Class C fly ashes typically contain high calcium oxide content. Presence of high calcium oxide content makes Class C fly ashes possess cementitious properties leading to the formation of calcium silicate and calcium aluminate hydrates when mixed with water. As will be seen in the examples below, Class C fly ash has been found to provide superior results, particularly in the preferred formulations in which high alumina cement and gypsum are not used.

The weight ratio of the pozzolanic material to the Portland cement in the cementitious reactive powder blend used in the cementitious composition of the invention may be about 0/100 to 150/100, preferably 25/100 to 125/100. For example, a typical cementitious reactive powder blend has about 10 to 60 wt. % fly ash and 40 to 90 wt. % Portland cement.

High Alumina Cement

High alumina cement (HAC) is another type of hydraulic cement that may form a component of the reactive powder blend of some embodiments of the invention.

High alumina cement is also commonly referred to as aluminous cement or calcium aluminate cement. As the name implies, high alumina cements have a high alumina content, about 36-42 wt % is typical. Higher purity high alumina cements are also commercially available in which the alumina content can range as high as 80 wt %. These higher purity high alumina cements tend to be very expensive relative to other cements. The high alumina cements used in the compositions of some embodiments of the invention are finely ground to facilitate entry of the aluminates into the aqueous phase so that rapid formation of ettringite and other calcium aluminate hydrates can take place. The surface area of the high alumina cement that may be used in some embodiments of the composition of the invention will be greater than 3,000 $cm^2$/gram and typically about 4,000 to 6,000 $cm^2$/gram as measured by the Blaine surface area method (ASTM C 204).

Several methods have emerged to manufacture high alumina cement. Typically, the main raw materials for manufacturing high alumina cement are bauxite and limestone. One manufacturing method used in the US for producing high alumina cement is described as follows. The bauxite ore is first crushed and dried, then ground along with limestone. The dry powder comprising bauxite and limestone is then fed into a rotary kiln. A pulverized low-ash coal is used as fuel in the kiln. Reaction between bauxite and limestone takes place in the kiln and the molten product collects in the lower end of the kiln and pours into a trough set at the bottom. The molten clinker is quenched with water to form granulates of the clinker, which is then conveyed to a stock-pile. The granulate is then ground to the desired fineness to produce the final cement.

Several calcium aluminate compounds are formed during the manufacturing process of high alumina cement. The predominant compound formed is monocalcium aluminate (CA). The other calcium aluminate and calcium silicate compounds that are formed include $C_{12}A_7$, $CA_2$, $C_2S$, $C_2AS$.

Several other compounds containing relatively high proportion of iron oxides are also formed. These include calcium ferrites such as CF and $C_2F$, and calcium alumino-ferrites such as $C_4AF$, $C_6AF_2$ and $C_6A_2F$. Other minor constituents present in the high alumina cement include magnesia (MgO), titanic ($TiO_2$), sulfates and alkalis. It should be noted that tri-calcium aluminate ($C_3A$) seen in ordinary Portland cement is not found in high alumina cements.

Calcium Sulfate

Various forms of calcium sulfate as shown below may be used in the invention to provide sulfate ions for forming ettringite and other calcium sulfo-aluminate hydrate compounds:

Dihydrate—$CaSO_4.2H_2O$ (commonly known as gypsum)

Hemihydrate—$CaSO_4.½H_2O$ (commonly known as stucco)

Anhydrite—$CaSO_4$ (also referred to as anhydrous calcium sulfate)

Land plaster is a relatively low purity gypsum and is preferred due to economic considerations, although higher purity grades of gypsum could be used. Land plaster is made from quarried gypsum and ground to relatively small particles such that the specific surface area is greater than 2,000 $cm^2/$gram and typically about 4,000 to 6,000 $cm^2/$gram as measured by the Blaine surface area method (ASTM C 204). The fine particles are readily dissolved and supply the gypsum needed to form ettringite. Synthetic gypsum obtained as a by-product from various manufacturing industries can also be used as a preferred calcium sulfate in the present invention. The other two forms of calcium sulfate, namely, hemihydrate and anhydrite may also be used in the present invention instead of gypsum, i.e., the dihydrate form of calcium sulfate.

Air-Entraining Agents (Foaming Agents)

When it is desired to produce the present lightweight products such as lightweight cement boards, air-entraining agents (foaming agents) may be added in the composition to lighten the product. Air-entrainment agents are generally suitable surfactants that form a stable and uniform structure of air voids in the finished product. Accordingly the slurry contains a suitable air entrainment or foaming agent in such amounts to produce the desired degree of air entrainment.

Typically air entraining agents or foaming agents are surfactants, provided in an amount from about 0.0015 to 0.03 wt. %, based upon the total slurry weight. More preferably, the weight of these surfactants ranges between 0.002 to 0.02 wt. %, based upon the total slurry weight. For example, sodium alkyl ether sulfate, ammonium alkyl ether sulfate, sodium alpha olefin sulfonate (AOS), sodium deceth sulfate, ammonium deceth sulfate, sodium laureth sulfate, or sodium dodecylbenzene sulfonate are suitable air entraining and foaming surfactants that can be used in the cementitious compositions of the invention.

In the cementitious compositions of the invention, externally produced foam is preferably used to reduce slurry and product density. The foam is prepared using suitable surfactants (foaming agents) together with water and air in proper proportions combined in foam generation equipment. The foam so produced is then introduced directly in to the wet mixture during the mixing operation while preparing cementitious slurry.

Alkanolamines

In the present invention, different varieties of alkanolamines can be used alone or in combination to accelerate the setting characteristics of the cementitious composition of the invention. Alkanolamines are amino alcohols that are strongly alkaline and cation active. Triethanolamine [$N(CH_2—CH_2OH)_3$] is the preferred alkanolamine. However, other alkanolamines, such as monoethanolamine [$NH_2(CH_2—CH_2OH)$], diethanolamine [$NH(CH_2—CH_2OH)_2$] may be substituted for triethanolamine (TEA) or used in combination with TEA.

Addition of alkanolamine alone, or in addition to phosphate (described below), has a significant influence on the rapid setting characteristics of the cementitious compositions of the invention when initiated at elevated temperatures, for example a slurry temperature greater than 90° F. (32° C.). Typically the slurry has an initial temperature of about 90-150° F. (32-66° C.).

If used without phosphate the dosage of alkanolamine, preferably triethanolamine, employed as an accelerator in the slurry is typically about 0.025 to 4.0 wt. %, 0.05 to 2 wt. %, 0.05 to 1 wt. %, 0.05 to 0.40 wt. %, 0.05 to 0.20 wt. %, or 0.05 to 0.10 wt. % based on the weight of cementitious reactive powder.

Thus, for example, for every 100 pounds of cementitious reactive powder there is about 0.025 to 4.0 pounds of alkanolamine in the mixture.

Phosphates

If desired, phosphates may optionally be used together with alkanolamine, e.g., triethanolamine, as an accelerator. Such phosphates may be one or more of sodium trimetaphosphate (STMP), potassium tripolyphosphate (KTPP) and sodium tripolyphosphate (STPP)

The dosage of phosphate is about 0 to 1.5 wt. %, or 0.15 to 1.5 wt. %, or about 0.3 to 1.0 wt. %, or about 0.5 to 0.75 wt. % based on the cementitious reactive components of the invention. Thus, for example, for 100 pounds of cementitious reactive powder, there may be about 0 to 1.5 pounds of phosphate.

The degree of rapid set obtained with the addition of an appropriate dosage of phosphate under conditions that yield slurry temperature greater than 90° F. (32° C.) allows a significant reduction of alkanolamine in the absence of high alumina cement.

Retarders

Use of set retarders as a component in the compositions of the invention is particularly helpful in situations where the initial slurry temperatures used to form the cement-based products are particularly high, typically greater than 100° F. (38° C.). At such relatively high initial slurry temperatures, retarders such as sodium citrate or citric acid promote synergistic physical interaction and chemical reaction between different reactive components in the compositions resulting in favorable slurry temperature rise response and rapid setting behavior. Without the addition of retarders, stiffening of the reactive powder blend of the invention may occur very rapidly, soon after water is added to the mixture. Rapid stiffening of the mixture, also referred to here as "false setting" is undesirable, since it interferes with the proper and complete formation of ettringite, hinders the normal formation of calcium silicate hydrates at later stages, and leads to development of extremely poor and weak microstructure of the hardened cementitious mortar.

The primary function of a retarder in the composition is to keep the slurry mixture from stiffening too rapidly thereby promoting synergistic physical interaction and chemical reaction between the different reactive components. Other secondary benefits derived from the addition of retarder in the composition include reduction in the amount of superplasticizer and/or water required to achieve a slurry mixture of workable consistency. All of the aforementioned benefits are achieved due to suppression of false setting. Examples of some useful set retarders include sodium citrate, citric acid, potassium tartrate, sodium tartrate, and the like. In the compositions of the invention, sodium citrate is the preferred set retarder. Furthermore, since set retarders prevent the slurry mixture from stiffening too rapidly, their addition plays an important role and is instrumental in the formation of good edges during the cement board manufacturing process. The weight ratio of the set retarder to the cementitious reactive powder blend generally is less than 1.0 wt. %, preferably about 0.04-0.3 wt. %.

Inorganic Secondary Set Accelerators

In combination with the above-discussed alkanolamines and optional phosphates, other inorganic set accelerators may be added as inorganic secondary set accelerators in the cementitious composition of the invention.

Addition of these inorganic secondary set accelerators is expected to impart only a small reduction in setting time in comparison to the reduction achieved due to the addition of the combination of alkanolamines and optional phosphates. Examples of such inorganic secondary set accelerators include a sodium carbonate, potassium carbonate, calcium nitrate, calcium nitrite, calcium formate, calcium acetate, calcium chloride, lithium carbonate, lithium nitrate, lithium nitrite, aluminum sulfate and the like. The use of calcium chloride should be avoided when corrosion of cement board fasteners is of concern.

The weight ratio of the secondary inorganic set accelerator to the cementitious reactive powder blend typically will be less than 2 wt %, preferably about 0.0 to 1 wt %. In other words, for 100 pounds of cementitious reactive powder there is typically less than 2 pounds, preferably about 0.0 to 1 pounds, of secondary inorganic set accelerator. These secondary set accelerators can be used alone or in combination.

Other Chemical Additives and Ingredients

Other additives including water reducing agents such as superplasticizers, shrinkage control agents, slurry viscosity modifying agents (thickeners), coloring agents and internal curing agents, may be included as desired depending upon the processability and application of the cementitious composition of the invention.

Chemical additives such as water reducing agents (superplasticizers) may be included in the compositions of the invention and added in the dry form or in the form of a solution. Superplasticizers help to reduce the water demand of the mixture. Examples of superplasticizers include polynapthalene sulfonates, polyacrylates, polycarboxylates, lignosulfonates, melamine sulfonates, and the like.

Depending upon the type of superplasticizer used, the weight ratio of the superplasticizer (on dry powder basis) to the reactive cementitious powder typically will be about 2 wt. % or less, preferably about 0.1 to 1.0 wt. %, more preferably about 0.0 to 0.50 wt. %, and most preferably about 0.0 to 0.20 wt. %. Thus, for example, when superplasticizer is present in the range 0.1 to 1.0 wt. %, for every 100 pounds of cementitious reactive powder in the mixture, there may be about 0.1 to 1 pounds of superplasticizer.

Other chemical admixtures such as shrinkage control agents, coloring agents, viscosity modifying agents (thickeners) and internal curing agents may also be added in the compositions of the invention if desired.

Aggregates, Fillers and Scrims

While the disclosed cementitious reactive powder blend defines the rapid setting component of the cementitious composition of the invention, it will be understood by those skilled in the art that other materials may be included in the composition depending on its intended use and application.

For instance, for cement board applications, it is desirable to produce lightweight boards without unduly comprising the desired mechanical properties of the product. This objective is achieved by adding lightweight aggregates and lightweight fillers. Examples of useful lightweight aggregates and fillers include blast furnace slag, volcanic tuff, pumice, expanded forms of clay, shale, hollow ceramic spheres, hollow plastic spheres, expanded plastic beads, and the like. For producing cement boards, expanded clay and shale aggregates are particularly useful. Expanded plastic beads and hollow plastic spheres when used in the composition are employed in very small quantity on weight basis owing to their extremely low bulk density.

Pumice used as lightweight aggregate is a hydrated aggregate (filler) and not cement. In contrast, pumice used as pozzolanic mineral additive (describe in the above-listed section entitled "Mineral Additives") is a non-hydrated form and falls within the ASTM C618-97 definition of pozzolanic materials as "siliceous or siliceous and aluminous materials which in themselves possess little or no cementitious value, but will, in finely divided form and in the presence of moisture, chemically react with calcium hydroxide at ordinary temperatures to form compounds possessing cementitious properties."

Depending on the choice of lightweight aggregate or filler selected, the weight ratio of the lightweight aggregate or filler to the reactive powder blend may be about 1/100 to 200/100, preferably about 2/100 to 125/100. For example, for making lightweight cement boards, the weight ratio of the lightweight aggregate or filler to the cementitious reactive powder blend may be about 2/100 to 125/100.

However, as mentioned above, preferably the total of expanded and chemically coated perlite filler and secondary fillers, for example expanded clay, shale aggregate and/or pumice, is at least 20% wt.

Moisture content of aggregates adversely affects the setting time of the cementitious mixtures. Thus, aggregates and fillers having low water content are preferred in the present invention.

Discrete reinforcing fibers of different types may also be included in the cementitious compositions of the invention. Scrims made of materials such as polymer-coated glass fibers and polymeric materials such as polypropylene, polyethylene and nylon may be used to reinforce the cement-based product depending upon its function and application. Cement boards, produced according the present invention, are typically reinforced with scrims made of polymer-coated glass fibers.

Manufacturing of Precast Concrete Products Such as Cement Boards

Precast concrete products such as cement boards are manufactured most efficiently in a continuous process in which the reactive powder blend is blended with aggregates, fillers and other ingredients, followed by addition of water and other chemical additives just prior to placing the mixture in a mold or over a continuous casting and forming belt.

Due to the rapid setting characteristics of the cementitious mixture the mixing of dry components of the cementitious blend with water usually will be done just prior to the casting operation. As a consequence of the formation of hydrates of calcium aluminate compounds and the associated water consumption in substantial quantities, the cement-based product becomes rigid, and ready to be cut, handled and stacked for further curing.

Thus, the cementitious reactive composition of the invention is combined with a suitable amount of water to hydrate the cementitious reactive powder and to rapidly form ettringite and other hydrates of calcium aluminate compounds. Generally, the amount of water added will be greater than theoretically required for the hydration of the cementitious reactive powder. This increased water demand is allowed to facilitate the workability of the cementitious slurry. Typically, the weight ratio of the water to cementitious reactive powder blend is about 0.20/1 to 0.80/1, preferably about 0.45/1 to 0.65/1. The amount of water depends on the needs of the individual materials present in the cementitious composition.

Ettringite and other hydrates of calcium aluminate compounds form very rapidly in the hydration process thus imparting rapid set and rigidity to the mixtures made with the reactive powder blend of the cementitious composition of the invention. In manufacturing of cement-based products such as cement boards, it is primarily the formation of ettringite and other calcium aluminate hydrates that makes possible handling of cement boards within a few minutes after the cementitious composition of the invention is mixed with a suitable amount of water.

Setting of the composition is characterized by initial and final set times, as measured using Gillmore needles specified in the ASTM C266 test procedure, as well as high initial compressive strength. The final set time also corresponds to the time when a cement-based product e.g. a cement board, has sufficiently hardened so that it can be handled. It will be understood by those skilled in the art that curing reactions continue for extended periods after the final setting time has been reached.

The slurry is typically formed under conditions which provide an initially high slurry temperature. The initial slurry temperature should be at least about 40° F. (4.4° C.). For example, the initial slurry temperature may be at least about 90° F. (32° C.). Slurry temperatures in the range of 90° F. to 150° F. (32° to 66° C.) produce very short setting times. In general, within this range increasing the initial temperature of the slurry increases the rate of temperature rise as the reactions proceed and reduces the setting time. Thus, an initial slurry temperature of 95° F. (35° C.) is preferred over an initial slurry temperature of 90° F. (32° C.), a temperature of 100° F. (38° C.) is preferred over 95° F. (35° C.), a temperature of 105° F. (41° C.) is preferred over 100° F. (38° C.), a temperature of 110° F. (43° C.) is preferred over 105° F. (41° C.) and so on. It is believed the benefits of increasing the initial slurry temperature decrease as the upper end of the broad temperature range is approached.

As will be understood by those skilled in the art, achieving an initial slurry temperature may be accomplished by more than one method. Perhaps the most convenient method is to heat one or more of the components of the slurry. In the examples, the present inventors supplied water heated to a temperature such that, when added to the dry reactive powders and unreactive solids, the resulting slurry is at the desired temperature. Alternatively, if desired the solids could be provided at above ambient temperatures. Using steam to provide heat to the slurry is another possible method that could be adopted. Although not preferred, a slurry could be prepared at ambient temperatures and promptly heated to raise the temperature to about 90° F. or higher, where the benefits of the invention can be achieved. The initial slurry temperature is preferably about 120° F. to 130° F. (49° to 54° C.).

Example 1

The following examples illustrates producing lightweight cement boards in a commercial manufacturing process using cementitious compositions of the invention. The raw materials used included a cementitious reactive powder of Portland cement Type III, class F fly ash, and calcium sulfate dihydrate (landplaster), chemically coated perlite, expanded clay and shale aggregate and added liquids. The liquids, e.g., triethanolamine, were admixtures added as aqueous solutions. In addition, sodium citrate and sulfonated napthalene superplasticizer were added to control the fluidity of the mixes. These admixtures were added as weight percentage of the total reactive powder.

TABLE 2 shows specific composition used to produce 0.5 inch (1.27 cm) thick lightweight cement panels having a density of about 56 pounds per cubic foot (pcf) (0.9 g/cc).

TABLE 2

Example 1 lightweight cementitious composition

| Ingredient | Weight % | Volume % |
|---|---|---|
| Portland cement-based binder (cementitious reactive powder)[1] | 47.8 | 14.4 |
| Chemically coated perlite | 4.8 | 17.2 |
| Expanded clay and shale aggregate | 21.5 | 12.9 |
| Total Liquids[2] | 25.8 | 23.1 |
| Entrained Air[3] | — | 32.5 |

[1]Portland Cement - 100 parts by weight; Fly Ash 30 parts by weight; Land Plaster - 3 parts by weight
[2]Total liquids is a combination of water plus the following chemical additives added to water to form a solution: Aluminum Sulfate - 0.10 wt. % based on weight of Portland cement-based binder Triethanolamine - 0.30 wt. % based on weight of Portland cement-based binder Napthalene Sulfonate based superplasticizer - 0.30 wt. % based on weight of Portland cement-based binder Sodium Citrate - 0.20 wt. % based on weight of Portland cement-based binder
[3]Entrained Air in the composite provided by using sodium alpha olefin sulfonate (AOS) surfactant. The surfactant was added at a dosage rate of 0.009 wt. % of the total product weight.

The chemically coated perlite was SILBRICO brand perlite, model SIL-CELL 35-23 having a median particle diameter of 40 microns and an alkyl alkoxy silane coating.

Entrained air in the board was introduced by means of surfactant foam that was prepared separately and added directly to the wet cementitious slurry in the slurry mixer. Sodium alpha olefin sulfonate (AOS) surfactant in a water-based solution was used to prepare the foam. The surfactant concentration in the water-based solution was 0.90 wt %. It should be noted that a combination of entrained air, perlite, and expanded clay aggregate in the composition was responsible for achieving the targeted low slurry density.

The manufactured cement boards were skin-reinforced using alkali-resistant, polyvinyl chloride (PVC) coated fiberglass mesh embedded in cementitious slurry. The reinforcing mesh was manufactured by Saint-Gobain Technical Fabrics.

The composition included in the example was combined using a weight ratio of water to cement (cementitious reactive powder) of 0.54:1 and a weight ratio of expanded shale aggregate to cementitious reactive powder ratio of 0.45:1. The dry reactive powder ingredients, perlite, and aggregate used were mixed with water under conditions which provided an initial slurry temperature above ambient. Hot water was used having a temperature which produced slurry having an initial temperature within the range of 125° to 140° F. (51.7° to 60.0° C.).

The dosage rates of various chemical-additives (triethanolamine, sodium citrate, aluminum sulfate and naphthalene sulfonate superplasticizer) were adjusted to achieve desired flow behavior and rapid-setting characteristics.

The manufactured cement boards were hard and could be handled within 10 minutes subsequent to slurry preparation and board formation.

Mechanical testing was conducted to characterize the physical properties of the manufactured lightweight cement boards.

Flexural strength was measured according to the testing per ASTM C 947.

Maximum deflection was measured using the flexural load versus deflection plot obtained for a specimen tested in flexure per ASTM C 947. Maximum deflection represents the displacement of the specimen at the middle-third loading points corresponding to the peak load.

Nail pull strength was measure according to the testing per ASTM D1037.

Two days after manufacturing, the boards were tested for characterization of flexural performance per ASTM C947. TABLE 3 shows the flexural performance of tested boards. Results shown in the table demonstrate the panels developed excellent flexural strength and flexural ductility.

TABLE 3

Flexural performance of cement boards made using the lightweight cementitious composition of Example 1

| Sample Orientation | Flexural Strength (psi) | Maximum Deflection (inches) |
| --- | --- | --- |
| Machine Direction | 1262 | 0.99 |
| Cross-Machine Direction | 1138 | 0.94 |

TABLE 4 shows the nail pull performance of the manufactured panels. The panels were tested for nail pull strength in accordance with Test Method D 1037 utilizing a roofing nail with a 0.375 in. (10 mm) diameter head and a shank diameter of 0.121 in. (3 mm). The data shown in TABLE 4 demonstrates satisfactory nail pull performance of the panels of the invention.

TABLE 4

Nail pull performance of cement boards made using the composition of Example 1

| Sample Orientation | Nail Pull Strength (lbs.) |
| --- | --- |
| Face-Up | 135 |
| Face-Down | 133 |

Example 2

The following example illustrates producing lightweight cement boards in a commercial manufacturing process using cementitious composition of the invention. The raw materials used included a cementitious reactive powder of Portland cement Type III, class F fly ash, and calcium sulfate dihydrate (landplaster), chemically coated perlite, expanded clay and shale aggregate and added liquids. The liquids, e.g., triethanolamine, were admixtures added as aqueous solutions. In addition, sodium citrate and sulfonated napthalene superplasticizer were added to control the fluidity of the mixes. These admixtures were added as weight percentage of the total reactive powder.

TABLE 4 shows specific composition used to produce 0.5 inch thick lightweight cement panels having a density of about 60 pounds per cubic foot (pcf) (0.96 g/cc).

TABLE 4

Example 2 lightweight cementitious composition

| Ingredient | Weight % | Volume % |
| --- | --- | --- |
| Portland cement-based binder (cementitious reactive powder)[1] | 47.8 | 15.2 |
| Chemically coated perlite | 5.7 | 21.9 |
| Expanded clay and shale aggregate | 16.7 | 10.6 |
| Total Liquids[2] | 29.7 | 28.1 |
| Entrained Air[3] | — | 24.2 |

[1]Portland Cement - 100 parts by weight; Fly Ash 30 parts by weight; Land Plaster - 3 parts by weight
[2]Total liquids is a combination of water plus the following chemical additives added to water to form a solution: Aluminum Sulfate - 0.10 wt. % based on weight of Portland cement-based binder Triethanolamine - 0.30 wt. % based on weight of Portland cement-based binder Napthalene Sulfonate based superplasticizer - 0.30 wt. % based on weight of Portland cement-based binder Sodium Citrate - 0.20 wt. % based on weight of Portland cement-based binder
[3]Entrained Air in the composite provided by using sodium alpha olefin sulfonate (AOS) surfactant. The surfactant was added at a dosage rate of 0.005 wt. % of the total product weight.

The chemically coated perlite was SILBRICO brand perlite, model SIL-CELL 35-23 having a median particle diameter of 40 microns and an alkyl alkoxy silane coating. Entrained air in the board was introduced by means of surfactant foam that was prepared separately and added directly to the wet cementitious slurry in the slurry mixer. Sodium alpha olefin sulfonate (AOS) surfactant in a water-based solution was used to prepare the foam. The surfactant concentration in the water-based solution was 0.90 wt. %. It should be noted that a combination of entrained air, perlite, and expanded clay aggregate in the composition was responsible for achieving the targeted low slurry density.

The manufactured cement boards were skin-reinforced using alkali-resistant, PVC coated fiberglass mesh embedded in cementitious slurry. The reinforcing mesh was manufactured by Saint-Gobain Technical Fabrics.

The composition included in the example was combined using a weight ratio of water to cement (cementitious reactive powder) of 0.62:1 and a weight ratio of expanded shale aggregate to cementitious reactive powder ratio of 0.35:1. The dry reactive powder ingredients, perlite, and aggregate used were mixed with water under conditions which provided an initial slurry temperature above ambient. Hot water was used having a temperature which produced slurry having an initial temperature within the range of 125° F. to 140° F. (51.7° to 60.0° C.). The dosage rates of chemical-additives (triethanolamine, sodium citrate, aluminum sulfate and naphthalene sulfonate superplasticizer) were adjusted to achieve desired flow behavior and rapid-setting characteristics.

The manufactured cement boards were hard and could be handled within 10 minutes subsequent to slurry preparation and board formation.

Mechanical testing was conducted to characterize the physical properties of the manufactured lightweight cement boards. Flexural strength was measured according to the testing per ASTM C 947. Maximum deflection was measured using the flexural load versus deflection plot obtained for a specimen tested in flexure per ASTM C 947. Maximum deflection represents the displacement of the specimen at the middle-third loading points corresponding to the peak load. Nail pull strength was measure according to the testing per ASTM D1037.

Two days after manufacturing, the boards were tested for characterization of flexural performance per ASTM C947. TABLE 5 shows the flexural performance of tested boards. Results shown in the table demonstrate the panels developed excellent flexural strength and flexural ductility.

TABLE 5

Flexural performance of cement boards made using the
lightweight cementitious composition of Example 2

| Sample Orientation | Flexural Strength (psi) | Maximum Deflection (inches) |
|---|---|---|
| Machine Direction | 1249 | 0.94 |
| Cross-Machine Direction | 1111 | 0.95 |

TABLE 6 shows the nail pull performance of the manufactured panels. The panels were tested for nail pull strength in accordance with Test Method D 1037 utilizing a roofing nail with a 0.375 in. (9.5 mm) diameter head and a shank diameter of 0.121 in. (3 mm). The data shown in TABLE 6 demonstrates satisfactory nail pull performance of the panels of the invention.

TABLE 6

Nail pull performance of cement boards made using the composition of Example 2

| Sample Orientation | Nail Pull Strength (lbs.) |
|---|---|
| Face-Up | 136 |
| Face-Down | 139 |

Example 3

The mesh reinforced cementitious panels from Example 2 were tested for their suitability as a substrate for bonding ceramic tiles. Quarry tiles were bonded to cement panels of Example 2 utilizing a latex modified cementitious thin-set mortar conforming to ANSI A118.4 standard. LATICRETE® 317 Floor N' Wall Thin Set Mortar was mixed with LATICRETE® 333 Super Flexible Additive to prepare the thin-set mortar for bonding tiles to cement board. The prepared specimens were cured for 28-days and tested per ANSI A118.10 standard to characterize shear-bond strength. TABLE 7 shows the shear-bond strength of the tested specimen. From the data, it can be observed that the specimen developed a shear-bond strength of 241 psi (1.66 MPa), which far exceeds the minimum shear-bond strength requirement of 50 psi (0.34 MPa) per ANSI A118.10 standard. This testing demonstrates that cementitious formulations and products of the invention develop extremely good shear-bond strength with ceramic tiles and cement mortar.

TABLE 7

Shear strength of cement board to ceramic tiles and cement mortar

| Cement Board Identification | Shear Strength (psi) |
|---|---|
| Cement Board from Example 2 (60 pcf density) | 241 |

Example 4

The mesh reinforced cementitious panels from Example 2 were tested for waterproofness by characterizing their ability to resist water penetration through the panel thickness when the top surface of the panel was subjected to a hydrostatic pressure of 24 inches (61 cm). A plastic hollow tube, 24 inches (61 cm) long and having an internal diameter of 2 inches (5.1 cm) was adhesively mounted to the top panel surface. The tube was filled with water to a height of 24 inches (61 cm). At the end of 48-hours, the bottom surface of the panel was monitored to check for wetness or for formation of water droplets. No wetness or formation of water droplets were observed on the bottom panel surface at the end of 48-hours. This result thus demonstrates waterproofing characteristic of the panel per ANSI A118.10 standard. It is particularly noteworthy that the panels of the invention display waterproofing characteristics despite having extremely high porosity. It is in fact the silane chemical coating on the SIL-CELL 35-23 particles that provides water repellency to the cementitious core and resists penetration of water through the product thickness.

Example 5

The mesh reinforced cementitious panels from Example 2 were tested for their stability and durability under repeated freezing and thawing exposure. The panels were subjected to multiple freeze-thaw cycles per ASTM C1185 standard. One freeze-thaw cycle comprised of the following: i. maintaining the samples at 4° C. for 1 hour, ii. cooling the samples to a temperature of −17° C. in next 1 hour, iii. maintaining the samples at −17° C. for another 1 hour, and finally, iv. thawing the samples to a temperature of 4° C. in next one hour. The panels were subjected to a total of 300 freeze-thaw cycles. The tested panels did not develop cracking, delamination, or any other type of damage at the completion of 300 freeze-thaw cycles. This testing thus demonstrated excellent freeze-thaw stability and durability performance of the panels of the invention.

Example 6

The mesh reinforced cementitious panels from Example 2 were tested for their resistance to mold growth per ASTM D3273, fungal growth per ASTM G21, and bacteria growth per ASTM G22. TABLE 8 summarizes the results obtained from the investigation. From the results shown in TABLE 8 it can be clearly observed that the cement formulations and products of the invention intrinsically possess extremely good resistance to mold, bacteria, and fungal growth.

TABLE 8

Mold resistance, bacteria resistance and fungus resistance of cement panels from Example 2

| Property | ASTM Standard | Result |
|---|---|---|
| Mold Resistance | ASTM D3273 | 10 (No Growth) |
| Fungus Resistance | ASTM G21 | 0 (No Growth) |
| Bacteria Resistance | ASTM G22 | 0 (No Growth) |

Example 7

The following example illustrates producing lightweight cement boards having a density of about 50 pounds per cubic foot (pcf) (0.8 g/cc) in a commercial manufacturing process using cementitious composition of the invention. The raw materials used included a cementitious reactive powder of Portland cement Type III, class F fly ash, and calcium sulfate dihydrate (landplaster), chemically coated perlite, expanded clay and shale aggregate and added liquids. The liquids, e.g., triethanolamine, were admixtures added as aqueous solutions. In addition, sodium citrate and sulfonated napthalene superplasticizer were added to control the fluidity of the mixes. These admixtures were added as weight percentage of the total reactive powder.

TABLE 9 shows specific composition used to produce 0.5 inch (1.27 cm) thick lightweight cement panels having a density of about 50 pcf (0.8 g/cc).

TABLE 9

Example 7 Lightweight Cementitious Composition

| Ingredient | Weight % | Volume % |
|---|---|---|
| Portland cement-based binder (cementitious reactive powder)[1] | 47.8 | 12.7 |
| Chemically coated perlite | 5.7 | 18.2 |
| Expanded clay and shale aggregate | 16.7 | 8.9 |
| Total Liquids[2] | 29.7 | 23.4 |
| Entrained Air[3] | — | 36.8 |

[1]Portland Cement—100 parts by weight; Fly Ash 30 parts by weight; Land Plaster—3 parts by weight
[2]Total liquids is a combination of water plus the following chemical additives added to water to form a solution: Aluminum Sulfate —0.10 wt. % based on weight of Portland cement-based binder Triethanolamine—0.30 wt. % based on weight of Portland cement-based binder Napthalene Sulfonate based superplasticizer—0.30 wt. % based on weight of Portland cement-based binder Sodium Citrate—0.20 wt. % based on weight of Portland cement-based binder
[3]Entrained Air in the composite provided by using sodium alpha olefin sulfonate (AOS) surfactant. The surfactant was added at a dosage rate of 0.007 wt. % of the total product weight.

The chemically coated perlite was SILBRICO brand perlite, model SIL-CELL 35-23 having a median particle diameter of 40 microns and an alkyl alkoxy silane coating. Entrained air in the board was introduced by means of surfactant foam that was prepared separately and added directly to the wet cementitious slurry in the slurry mixer. Sodium alpha olefin sulfonate (AOS) surfactant in a water-based solution was used to prepare the foam. The surfactant concentration in the water-based solution was 0.90 wt. %. It should be noted that a combination of entrained air, perlite, and expanded clay aggregate in the composition was responsible for achieving the targeted low slurry density.

The manufactured cement boards were skin-reinforced using alkali-resistant, PVC coated fiberglass mesh embedded in cementitious slurry. The reinforcing mesh was manufactured by Saint-Gobain Technical Fabrics.

The composition included in the example was combined using a weight ratio of water to cement (cementitious reactive powder) of 0.62:1 and a weight ratio of expanded shale aggregate to cementitious reactive powder ratio of 0.35:1. The dry reactive powder ingredients, perlite, and aggregate used were mixed with water under conditions which provided an initial slurry temperature above ambient. Hot water was used having a temperature which produced slurry having an initial temperature within the range of 125° F. to 140° F. (51.7° to 60.0° C.). The dosage rates of chemical-additives (triethanolamine, sodium citrate, aluminum sulfate and naphthalene sulfonate superplasticizer) were adjusted to achieve desired flow behavior and rapid-setting characteristics.

The manufactured cement boards were hard and could be handled within 10 minutes subsequent to slurry preparation and board formation.

Mechanical testing was conducted to characterize the physical properties of the manufactured lightweight cement boards. Flexural strength was measured according to the testing per ASTM C 947. Maximum deflection was measured using the flexural load versus deflection plot obtained for a specimen tested in flexure per ASTM C 947. Maximum deflection represents the displacement of the specimen at the middle-third loading points corresponding to the peak load. Nail pull strength was measure according to the testing per ASTM D1037.

Two days after manufacturing, the boards were tested for characterization of flexural performance per ASTM C947. TABLE 10 shows the flexural performance of tested boards. Results shown in the table demonstrate the panels developed excellent flexural strength and flexural ductility.

TABLE 10

Flexural performance of cement boards made using the lightweight cementitious composition of Example 7

| Sample Orientation | Flexural Strength (psi) | Maximum Deflection (inches) |
|---|---|---|
| Machine Direction | 1199 | 1.07 |
| Cross-Machine Direction | 1254 | 1.04 |

TABLE 11 shows the nail pull performance of the manufactured panels. The panels were tested for nail pull strength in accordance with Test Method D 1037 utilizing a roofing nail with a 0.375 inches (9.5 mm) diameter head and a shank diameter of 0.121 inches (3 mm). The data shown in TABLE 6 demonstrates satisfactory nail pull performance of the panels of the invention.

TABLE 11

Nail pull performance of cement boards made using the composition of Example 7

| Sample Orientation | Nail Pull Strength (lbs.) |
|---|---|
| Face-Up | 129 |
| Face-Down | 126 |

Example 8

Durability performance of the ½ inch (1.27 cm) thick panels from Example 7 was tested using the ASTM C627 Robinson Floor test, herein incorporated by reference. Sample floor for the test was prepared on 23/32 inches (1.83 cm) thick plywood panels laid on wooden joists spaced 16 inches on-center. The ½ inch (1.27 cm) thick cement panels were attached to the plywood using latex modified thin set mortar and mechanical fasteners (1⅝ inch (4.13 cm) long wood screws) spaced 8 inches (20 cm) on-center. Two-inch wide ceramic tiles were then laid on the cement board using latex modified thin-set mortar followed by grouting the tile joints 24-hours after the installation of ceramic tiles. The floor sample was allowed to cure for 28 days from the date of manufacture before the test was performed.

During the Robinson Floor Test, wheels of varying hardness and carrying varying loads are sequentially moved over the finished tile surface for 900 revolutions each. After completion of each cycle, the tiles are studied to determine if any of them are loose, broken or chipped. The grout is examined to establish if it has popped, cracked or powdered.

The tested floor showed no defects in the tile or grout through the 11th cycle of the test. The floor failed on the 12th cycle thus attaining a rating of "Moderate Commercial" per TCA 2007 Handbook for Ceramic Tile Installation, published by Tile Council of North America (TCNA).

Example 9

This example demonstrates effectiveness and influence of applied chemical coating on the chosen perlite fillers of the invention.

Three different perlite filler types were investigated:
1. SIL-CELL 35-BC Perlite: This perlite filler has a bulk density of about 8 pcf (0.13 g/cc), median particle size of 40 microns, and has no coating applied on the particle surface.
2. SIL-CELL 35-23 Perlite: This perlite filler has a bulk density of about 8 pcf (0.13 g/cc), median particle size of 40 microns, and a silane coating applied on the particle surface. Essentially, SIL-CELL 35-23 perlite is same as the SIL-CELL 35-BC perlite but additionally with a silane coating applied on the particle surface.
3. SIL-CELL 35-34 Perlite: This perlite filler has a bulk density of about 8 pcf (0.13 g/cc), median particle size of 40 microns, and a silicone coating applied on the particle surface. Essentially, SIL-CELL 35-34 perlite is same as SIL-CELL 35-BC perlite but additionally with a silicone coating applied on the particle surface.

All three perlite fillers investigated were produced by Silbrico Corporation. TABLE 12 shows compositions of the mixes investigated containing the above perlite fillers.

TABLE 12

Mix proportions of perlite mixes investigated in Example 9

| Ingredient | Mix #1 (wt. %) | Mix #2 (wt. %) | Mix #3 (wt. %) |
|---|---|---|---|
| Portland Cement Type III | 36.3 | 36.3 | 36.3 |
| Fly Ash Class C | 10.9 | 10.9 | 10.9 |
| Land Plaster | 1.1 | 1.1 | 1.1 |
| Expanded Shale Aggregate | 16.9 | 16.9 | 16.9 |
| Expanded Perlite | 5.8 (SIL-CELL 35-BC) | 5.8 (SIL-CELL 35-23) | 5.8 (SIL-CELL 35-34) |
| Water | 29.0 | 29.0 | 29.0 |

No liquid additives and no air entrainment were used in this investigation. All materials were mixed together under ambient conditions at a room temperature of 70° F. (21° C.). TABLE 13 summarizes the results from the investigation. Important results and conclusions are discussed below:

Mix #1 with uncoated perlite (SIL-CELL 35-BC) led to a slurry having extremely stiff consistency. On the other hand, Mixes #2 and #3 with coated perlite led to slurries having flowable consistencies. Uncoated SIL-CELL 35-BC filler absorb large amount of mix water thereby reducing the amount of water available to the cement paste. This makes the slurry extremely stiff and less workable. On the other hand, SIL-CELL 35-23 and SIL-CELL 35-34 perlite particles have a water-repellant chemical coating on the particle surface. These coatings greatly reduce the amount absorbed by the particle themselves. Thus, the slurries (Mixes #2 and #3) with these two coated perlite fillers have significantly better consistency and possess superior flow characteristics due to the higher amount of water availability in the cement paste.

Mix #1 with uncoated perlite (SIL-CELL 35-BC) led to a slurry having highest slurry density. On the other hand, Mixes #2 and #3 with coated perlite fillers led to slurries having slurry densities significantly lower than for Mix #1 with uncoated perlite. It is noteworthy that all three mixes investigated in this example had same amount of perlite filler, yet the resulting slurries for the three mixes ended up with very different densities. Absorption of water by the uncoated perlite filler (SIL-CELL 35-BC) in Mix #1 increased the weight and density of the perlite filler during mixing. Increased density of the SIL-CELL 35-BC perlite filler due to water absorption thus led to a relatively high slurry density for Mix #1. On the other hand, the water absorption of the coated perlite fillers (SIL-CELL 35-23 and SIL-CELL 35-34) was minimal, thus, the weight and density of the coated perlite fillers did not increase appreciably during mixing. The extremely low water absorption of the SIL-CELL 35-23 and SIL-CELL 35-34 perlite fillers and their consequent lower effective density thus ultimately led to lower slurry densities for Mixes #2 and #3.

The effective particle density of the uncoated perlite filler, i.e., SIL-CELL 35-BC perlite, was found to be 0.45 g/cc. In comparison, the coated perlite fillers were found to have significantly lower effective particle density. For instance, silane coated SIL-CELL 35-23 perlite filler were found to have an effective particle density of 0.25 g/cc.

Comparing the slurry density results for the three mixes and three perlite fillers investigated in this example it can easily be seen that the amount of perlite filler required to achieve any target slurry density would be highest for the compositions utilizing the uncoated perlite filler (i.e., SIL-CELL 35-BC perlite).

TABLE 13

Results for the mixes investigated in Example 9

| Property | Mix #1 (SIL-CELL 35-BC - Uncoated perlite particles) | Mix #2 (SIL-CELL 35-23 - Silane coated perlite particles) | Mix #3 (SIL-CELL 35-34 - Silicone coated perlite particles) |
|---|---|---|---|
| Slurry Consistency | Extremely Stiff | Flowable | Flowable |
| Slurry Density (pcf) | 91.5 | 79.3 | 76.7 |
| Calculated effective particle density of perlite filler (g/cc) | 0.45 | 0.25 | 0.23 |

Example 10

This example demonstrates influence of the size of coated perlite particles on mix properties. Two different perlite fillers were investigated:
1. SIL-CELL 35-23 Perlite: This perlite filler has a bulk density of about 8 pcf (0.13 g/cc), median particle size of 40 microns, and a silane coating applied on the particle surface.
2. Ryolex Silicone-Treated Masonry Fill Perlite: This perlite filler has a bulk density of about 7 pcf (0.11 g/cc), median particle size of 1180 microns, and a silicone coating applied on the particle surface.

Both perlite fillers investigated were produced by Silbrico Corporation. TABLE 14 shows compositions of the mixes investigated containing the above perlite fillers.

TABLE 14

Mix proportions of perlite mixes investigated in Example 10

| Ingredient | Mix #1 (wt. %) | Mix #2 (wt. %) |
|---|---|---|
| Portland Cement Type III | 36.3 | 36.3 |

TABLE 14-continued

Mix proportions of perlite mixes investigated in Example 10

| Ingredient | Mix #1 (wt. %) | Mix #2 (wt. %) |
|---|---|---|
| Fly Ash Class C | 10.9 | 10.9 |
| Land Plaster | 1.1 | 1.1 |
| Expanded Shale Aggregate | 16.9 | 16.9 |
| Coated Expanded Perlite | 5.8 (SIL-CELL 35-23) | 5.8 (Ryolex Silicone-Treated Masonry Fill) |
| Water | 29.0 | 29.0 |

No liquid additives and no air entrainment were used in this investigation.

All materials were mixed together under ambient conditions at a room temperature of 70° F. (21° C.). TABLE 15 summarizes the results from the investigation. Important results and conclusions are discussed below:

- Mix #2 with coated perlite filler having larger particle size (Ryolex Silicone-Treated Masonry Fill) led to a slurry having extremely stiff consistency. On the other hand, Mix #1 with coated perlite filler having smaller particle size (SIL-CELL 35-23) led to a slurry having flowable consistency. It is believed that larger perlite particles tend to be weak and prone to breakage during mixing. Breakage of perlite particles during mixing increases the water absorption of the particles thereby reducing the water available to the cement paste. This makes the slurry extremely stiff and less workable. On the other hand, SIL-CELL 35-23 perlite particles are significantly stronger in comparison owing to their small size and closed-cell honeycomb construction. The perlite particles with smaller size are therefore more tolerant to damage from mechanical agitation and mixing. This behavior keeps the water absorption of the perlite particles low and increases the amount of water available to the cement paste. Thus, the slurry with smaller sized perlite filler (SIL-CELL 35-23) has significantly better consistency and possesses superior flow characteristics due to the higher amount of water availability in the cement paste.
- Mix #2 with coated perlite filler having larger particle size (Ryolex Silicone-Treated Masonry Fill) led to a mixture having very high slurry density. In comparison, Mix #1 with coated perlite filler having smaller particle size (SIL-CELL 35-23) led to a mixture having significantly lower slurry density. It is noteworthy that both mixes investigated in this example had same amount of perlite filler by weight, yet the resulting mixtures for the two mixes ended up with very different slurry densities. Particle breakage and high water absorption of larger sized perlite particles (Ryolex Silicone-Treated Masonry Fill) are believed to be the primary reasons that led to higher slurry density for Mix #2.
- The effective particle density of the smaller sized perlite filler (i.e., SIL-CELL 35-23) was found to be 0.25 g/cc. In comparison, the larger sized perlite filler (Ryolex Silicone-Treated Masonry Fill) was found to have a significantly higher effective particle density equaling 0.80 g/cc. It is believed particle breakage and higher water absorption of the larger sized perlite filler used in Mix #2 led to a significantly higher effective particle density for Ryolex Silicone-Treated Masonry Fill perlite.

Comparing the slurry density results for the two mixes investigated in this example it can easily be seen that the amount of perlite filler required to achieve any target slurry density would be highest for the compositions utilizing the larger sized perlite filler (i.e., Ryolex Silicone-Treated Masonry Fill perlite).

TABLE 15

Results for the mixes investigated in Example 10

| Property | Mix #1 (SIL-CELL 35-23 - Silane coated perlite particles) | Mix #2 (Ryolex Silicone-Treated Masonry Fill - Silicone coated perlite particles) |
|---|---|---|
| Slurry Consistency | Flowable | Extremely Stiff |
| Slurry Density (pcf) | 79.3 | 96.8 |
| Calculated effective particle density of perlite filler (g/cc) | 0.25 | 0.80 |

Example 11

This example demonstrates rapid setting characteristics of the cementitious compositions of the invention. Mixes containing different perlite filler types were investigated:

1. SIL-CELL 35-BC Perlite: This perlite filler has a bulk density of about 8 pcf (0.13 g/cc), median particle size of 40 microns, and has no coating applied on the particle surface.
2. SIL-CELL 35-23 Perlite: This perlite filler has a bulk density of about 8 pcf (0.13 g/cc), median particle size of 40 microns, and a silane coating applied on the particle surface. Essentially, SIL-CELL 35-23 perlite is same as the SIL-CELL 35-BC perlite but additionally with a silane coating applied on the particle surface.
3. SIL-CELL 35-34 Perlite: This perlite filler has a bulk density of about 8 pcf (0.13 g/cc), median particle size of 40 microns, and a silicone coating applied on the particle surface. Essentially, SIL-CELL 35-34 perlite is same as SIL-CELL 35-BC perlite but additionally with a silicone coating applied on the particle surface.

All three perlite fillers investigated were produced by Silbrico Corporation. TABLE 16 shows compositions of the mixes investigated containing the above perlite fillers. It should be noted that the amount of perlite and total liquids added to the various mixes were adjusted to achieve constant slurry density and constant slurry slump between the mixes investigated.

TABLE 16

Mix proportions of perlite mixes investigated in Example 11

| Ingredient | Mix #1 (wt. %) | Mix #2 (wt. %) | Mix #3 (wt. %) |
|---|---|---|---|
| Portland Cement Type III | 28.9 | 36.4 | 36.4 |
| Fly Ash Class C | 8.7 | 10.9 | 10.9 |
| Land Plaster | 0.9 | 1.1 | 1.1 |
| Expanded Shale Aggregate | 13.5 | 17.1 | 16.9 |
| Expanded | 9.6 | 5.6 | 5.0 |

TABLE 16-continued

Mix proportions of perlite mixes investigated in Example 11

| Ingredient | Mix #1 (wt. %) | Mix #2 (wt. %) | Mix #3 (wt. %) |
|---|---|---|---|
| Perlite | (SIL-CELL 35-BC) | (SIL-CELL 35-23) | (SIL-CELL 35-34) |
| Total Liquids[1] | 38.5 | 29.0 | 29.2 |

[1]Total liquids is a combination of water plus the following chemical additives added to water to form a solution: Aluminum Sulfate—0.00 wt. % based on weight of Portland cement-based binder comprising of Portland Cement, Fly Ash and Land Plaster Triethanolamine—0.40 wt. % based on weight of Portland cement-based binder comprising of Portland Cement, Fly Ash and Land Plaster Napthalene Sulfonate based superplasticizer—0.10 wt. % based on weight of Portland cement-based binder comprising of Portland Cement, Fly Ash and Land Plaster Sodium Citrate—0.15 wt. % based on weight of Portland cement-based binder comprising of Portland Cement, Fly Ash and Land Plaster All materials were mixed together under conditions to obtain an initial slurry temperature of approximately 125° F. (52° C.). Slurry temperature rise response for the mixes investigated was recorded and is shown in FIG. 1. TABLE 17 summarizes the results from the investigation. Final set times were determined with Gillmore needles according to ASTM C266.

TABLE 17

Results for the mixes investigated in Example 11

| Property | Mix #1 (SIL-CELL 35-BC) | Mix #2 (SIL-CELL 35-23) | Mix #3 (SIL-CELL 35-34) |
|---|---|---|---|
| Mix Consistency | Flowable | Flowable | Flowable |
| Initial Slump (inches) | 4½" | 4½" | 4½" |
| Maximum Temperature Rise (° F.) | 154.5 | 168.8 | 165.1 |
| Final Set Time (minutes) | >120.0 | 6.0 | 7.0 |

Important results and conclusions from the investigation are discussed below:

The temperature rise response for the mixes containing coated perlite fillers (Mix 2 and Mix 3) was superior to that of the mix with uncoated perlite filler (Mix 1).

The mixes containing coated perlite fillers (Mix 2 and Mix 3) produced very short and rapid setting behavior. The final set times for these two mixes ranged from 6 to 7 minutes. On the contrary, the mix with uncoated perlite (Mix 1) had extremely slow setting behavior. The final set time for this mix was not attained even 2 hours after the slurry cast.

From commercial manufacturing perspective, mixes containing coated perlite fillers are preferred (SIL-CELL 35-23 and SIL-CELL 35-34) as these mixes would provide rapid processing of products and superior product strength and durability due to lower water usage in the composition.

Example 12

This example demonstrates influence of secondary filler addition, such as, expanded clay/shale aggregate on physical properties of finished product. The two mixes investigated are shown in TABLE 18.

TABLE 18

Example 12 lightweight cementitious compositions

| Ingredient | Mix #1 | Mix #2 |
|---|---|---|
| Portland cement-based binder (cementitious reactive powder)[1], wt. % | 59.0 | 48.3 |
| Chemically coated perlite, wt. % | 5.6 | 5.7 |
| Expanded shale aggregate, wt. % | 0.0 | 16.9 |
| Total Liquids[2], wt. % | 35.4 | 29.0 |
| Entrained Air[3], vol. % | 26.6 | 25.3 |

[1]Portland Cement —100 parts by weight
[2]Total liquids is a combination of water plus the following chemical additives added to water to form a solution: Soda Ash—0.20 wt. % based on weight of Portland cement-based binder Triethanolamine—0.00 wt. % based on weight of Portland cement-based binder Napthalene Sulfonate based superplasticizer—0.50 wt. % based on weight of Portland cement-based binder Sodium Citrate—0.05 wt. % based on weight of Portland cement-based binder
[3]Alkyl Ether Sulfate (WITCOLATE 1276) surfactant. The surfactant was added at a dosage rate of 0.008 wt. % of the total product weight.

The raw materials used included a cementitious reactive powder of Portland cement Type III, chemically coated perlite, expanded shale aggregate and added liquids. The liquids, e.g., sodium citrate, were admixtures added as aqueous solutions. In addition, sodium carbonate and sulfonated naphtalene superplasticizer were added to control the fluidity of the mixes. These admixtures were added as weight percentage of the total reactive powder.

In the TABLE 18, it can be noted that Mix #1 contained no expanded shale aggregate. Whereas, Mix #2 contained included expanded shale aggregate in addition to coated perlite filler.

Using the compositions shown in TABLE 18, ½ inch (1.3 cm) thick lightweight cement panels having a density of about 60 pounds per cubic foot (pcf) (0.96 g/cc) were made.

The chemically coated perlite was SILBRICO brand perlite, model SIL-CELL 35-23, having a median particle diameter of 40 microns and an alkyl alkoxy silane coating. Entrained air in the board was introduced by means of surfactant foam that was prepared separately and added directly to the wet cementitious slurry in the slurry mixer. Alkyl ether sulfate surfactant in a water-based solution was used to prepare the foam. The surfactant concentration in the water-based solution was 1.00 wt. %. It should be noted that a combination of entrained air, perlite, and expanded clay aggregate in the composition was responsible for achieving the targeted low slurry density.

The manufactured cement boards were skin-reinforced using alkali-resistant, PVC coated fiberglass mesh embedded in cementitious slurry. The reinforcing mesh was manufactured by CCX Inc.

The composition included in the example was combined using a weight ratio of water to cement (cementitious reactive powder) of 0.60:1. In Mix #2, the weight ratio of expanded shale aggregate to cementitious reactive powder ratio of 0.35:1 was used. Mix #1 contained no expanded clay aggregate. The dry reactive powder ingredients, perlite, and aggregate when used were mixed with water under ambient conditions. All raw materials including water were used at room temperature to achieve a slurry temperature of about 70° F. (21° C.). The dosage rates of chemical-additives (sodium citrate, sodium carbonate and naphthalene sulfonate superplasticizer) were adjusted to achieve desired flow behavior and setting characteristics.

Mechanical testing was conducted to characterize the physical properties of the manufactured lightweight cement boards. Flexural strength was measured according to the testing per ASTM C 947. Maximum deflection was measured using the flexural load versus deflection plot obtained for a specimen tested in flexure per ASTM C 947. Maximum deflection represents the displacement of the specimen at the middle-third loading points corresponding to the peak load.

Seventeen days after manufacturing, the boards were tested for characterization of flexural performance per ASTM C947. TABLE 19 shows flexural performance of the tested boards under dry and wet conditions. Results shown in the table demonstrate the panels developed satisfactory flexural strength and flexural ductility. Furthermore, the panels under soaked condition demonstrated satisfactory mechanical performance.

TABLE 19

Flexural performance of cement boards made using the lightweight cementitious composition of Example 12

| Mix Identification | Tested Dry | | Tested Wet[1] | |
|---|---|---|---|---|
| | Flexural Strength (psi) | Maximum Deflection (inches) | Flexural Strength (psi) | Maximum Deflection (inches) |
| Mix #1 | 930 | 0.74 | 925 | 0.88 |
| Mix #2 | 1122 | 0.79 | 1044 | 0.91 |

[1]Samples soaked in water at 70° F. (21° C.) for 48-hours before testing.

TABLE 20 shows stability of the panels under soaked condition. Panels were soaked in water for 48-hours. Thickness of the panels was measured before and after soaking. In TABLE 20, it can be observed that the panel without and expanded shale aggregate (Mix #1) expanded slightly more that the panel containing aggregate (Mix #2). The thickness swell of the panel containing no aggregate (Mix #1) was 0.27%, on the other hand, the same for the panel containing expanded shale aggregate was 0.12%. This result demonstrates improvement in dimensional stability of the panels provided by the inclusion of the expanded clay aggregate in the lightweight cementitious compositions of the invention containing coated perlite.

TABLE 20

Characterization of thickness swell and dimensional stability of the panels of invention

| Mix Identification | Thickness Swell (%) |
|---|---|
| Mix #1 | 0.27 |
| Mix #2 | 0.12 |

1. Samples soaked in water at 70° F. for 48-hours before testing.

Although the preferred embodiments for implementing the present invention are described, it will be understood by those skilled in the art to which this disclosure is directed that modifications and additions may be made to the invention without departing from its spirit and scope.

The invention claimed is:

1. A cement board having a density of about 45 to 85 pounds per cubic foot (0.72 to 1.36 g/cc), and having a continuous phase resulting from the curing of an aqueous mixture comprising:
   35-60 parts by weight Portland cement-based binder,
   2-10 parts by weight expanded and coated perlite filler having a mean particle diameter of about 20 to 90 microns,
   10-50 volume % entrained air, and
   optional additives selected from one or more members of the group consisting of water reducing agents, set-accelerators, set-retarders; and
   0-25 parts by weight secondary filler, wherein the secondary filler is at least one of blast furnace slag, volcanic tuff, expanded clay, shale aggregate, hollow ceramic spheres, hollow plastic spheres, expanded plastic beads and pumice.

2. A method of forming a board of claim 1 from a lightweight cementitious slurry comprising:
   forming the slurry as a mixture of:
   35 to 60 wt. %, on a wet basis, cementitious reactive powder comprising Portland cement,
   2 to 10 wt. %, on a wet basis, expanded and coated and water repellant perlite filler,
   20 to 40 wt. % water,
   0 to 25 wt. %, on a wet basis, secondary filler, wherein the secondary filler is at least one of blast furnace slag, volcanic tuff, expanded clay, shale aggregate, hollow ceramic spheres, hollow plastic spheres, expanded plastic beads and pumice;
   10 to 50 vol. %, on a wet basis, entrained air;
   air-entraining agent and/or foaming agent and
   optional additive from at least one of water reducing agents, set-accelerators, and set-retarders;
   under conditions which provide an initial slurry temperature of at least about 40° F. (4.4° C.),
   wherein the perlite filler has a mean particle diameter between 20 to 90 microns; and
   forming and setting the slurry to produce the board.

3. The board of claim 1, wherein the perlite filler is coated with at least one of silane, siloxane, silicone and mixtures thereof.

4. The board of claim 1, wherein the board has top and bottom surfaces reinforced with reinforcing mesh, wherein the reinforcing mesh comprises inorganic material.

5. The board of claim 1, wherein the board has top and bottom surfaces reinforced with reinforcing mesh, wherein the reinforcing mesh comprises organic material.

6. The board of claim 1, wherein the reinforcing mesh comprises an alkali resistant fiberglass.

7. The board of claim 1, wherein the board has a thickness of about ¼ to 1 inches (6.3 to 25.4 mm).

8. The board of claim 1, wherein the board has nail pull strength of at least 90 lbs (40.8 kg) per ASTM D1037.

9. The board of claim 1, wherein the perlite filler has a mean particle diameter between 20 to 60 microns.

10. The board of claim 1, wherein the board has flexural strength of at least 400 psi (2.76 MPa) per ASTM C947.

11. The board of claim 1, wherein the perlite filler has a particle density less than 0.50 g/cc.

12. The board of claim 1, wherein the perlite filler has a particle density less than 0.30 g/cc.

13. The board of claim 1, wherein the board has shear strength to ceramic tile and cement mortar of at least 50 psi (0.34 MPa) per ANSI A118.10.

14. The board of claim 1,
   wherein the mixture comprises 10 to 25 wt. % said secondary fillers; and
   wherein the mixture further comprises a mineral additive comprising at least one of pumice, diatomaceous earth, silica fume, tuff, trass, rice husk, metakaolin, ground granulated blast furnace slag, Class C fly ash, calcium carbonate, mica and talc; and
   wherein a total of the perlite filler and secondary fillers is at least 20 wt. % of the mixture.

15. The board of claim 1, wherein the mixture comprises the set-accelerator, wherein the set-accelerator comprises an alkanolamine selected from the group consisting of triethanolamine, diethanolamine, monoethanolamine and mixtures thereof, wherein the amount of the alkanolamine is about 0.03 to 4 wt. % based on the weight of the cementitious reactive powder on a dry basis.

16. The board of claim 1, wherein the mixture further comprises at least one of high alumina cement and calcium sulfate.

17. A floor comprising cement boards of claim 1, with ability to pass a minimum of first three cycles of a test per ASTM C627 for structural durability.

18. The board of claim 1, wherein the mixture comprises the secondary filler, wherein the secondary filler is at least one of blast furnace slag, volcanic tuff, expanded clay, shale aggregate, hollow ceramic spheres, hollow plastic spheres, expanded plastic beads and pumice.

* * * * *